April 21, 1964 V. NAGY ETAL 3,130,114
PROCESS OF MANUFACTURING FIBREBOARDS AND
PRESSINGS FROM LIGNOCELLULOSE MATERIAL
Filed March 21, 1961
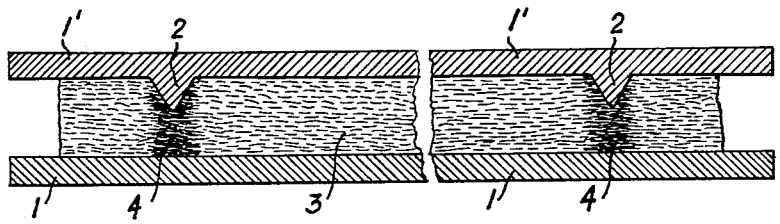
INVENTORS
Vojtěch Nagy, Anton Dvořák, Zdeněk
Sisler, Miloslav Keda, Tibor Ferko,
Karol Zembery
By Richard C... agt

3,130,114
PROCESS OF MANUFACTURING FIBREBOARDS AND PRESSINGS FROM LIGNOCELLULOSE MATERIAL
Vojtěch Nagy, Anton Dvořák, Zdenek Šisler, Miloslav Keda, Tibor Ferko, and Karol Zembery, all of Kosice, Czechoslovakia, assignors to Statny drevarsky vyskumny ustav, Bratislava, Czechoslovakia
Filed Mar. 21, 1961, Ser. No. 97,239
Claims priority, application Czechoslovakia Nov. 19, 1960
6 Claims. (Cl. 162—13)

This invention relates to the manufacture of fibreboards and other molded articles from lignocellulose materials.

It is known to manufacture hard fibreboards from wood chips or other lignocellulose materials by defibrating and by forming a mat from a water suspension of the fibres on a wire screen, whereby the mat is drained to a water content of 60–64%. The fibre mat deposited on the wire screen is then pressed in a heated hydraulic press into a board smooth on one side. This manufacturing method requires considerable quantities of water, and a certain amount of organic solubles as well as of short fibres is lost with the waste-water, causing thus pollution of rivers. Furthermore, the manufacture of fibreboards by the afore-described "wet process" requires much water, and plants must be located near a river. The known dry or semi-dry processes produce a mat from an air suspension of fibres. Fibreboards smooth on both side or only on one side can be pressed. The dry methods do not produce polluted waste-waters.

The fibreboards manufactured by the dry process have lower strength and higher water absorption than boards manufactured by the wet process unless synthetic resins or other adhesive materials are added. This requires supplementary equipment, and the synthetic resins are relatively expensive.

It is also known to manufacture boards or moldings from wood chips exposed to steam at pressures up to 70 atm., whereby the lignin in the lignocellulose material is activated and acts as a binding agent. These boards differ from boards manufactured by the wet process by their substantially lower dynamic strength. In addition, these boards have further reduced strength near the edges because of the escape of steam from the circumferential parts during hot pressing. This phenomenon produces a lighter colour at the edges of these boards. To obtain a board of uniform properties, relatively wide edge strips must be cut off.

It is a common feature of the known methods that the water-soluble substances formed during steaming of chipped wood are not utilized adequately for the binding in wood fibres of the board. In the manufacture of fibreboards by the wet process, these substances are drained to waste in the manufacturing process before pressing and in the first phase of the pressing cycle. In the dry process, the basic material is dried below 8% water content, and the water-matter cannot be utilized due to lack of the water required for the reaction. In the semi-dry manufacturing process, the humidity is maintained within the range of 25–36%, but this humidity is removed in the first stage of pressing by evaporation, and is not available for the formation of bonding substances.

According to our invention, a lignocellulose material is steamed before defibration at medium or low pressures. The resulting degradation of the lignocellulose material is controlled according to the quantity of water soluble materials determined by analysis. These materials affect the dynamic strength of the boards. Their quantity is maintained at predetermined ranges according to the kind of the processed material. Our invention is based on the combination of a controlled steaming of lignocellulose material at medium and low pressures with a subsequent processing of the defibrated raw material and the preparation of fibre mats.

According to this invention, fibreboards of high dynamic strength similar to those produced by the wet process are produced when the content of water soluble matter in the raw material is maintained during steaming of the material within the range of 6–30% and the humidity of the subsequently produced predried defibrated material is held at 2–30%. A steam-gas mixture is continuously or intermittently discharged from the pressing space in which the material is ultimately consolidated at temperatures of 180–260° C. and/at a pressure of 25–70 kg./cm.$^2$.

The accompanying drawing shows schematically the cauls used in pressing of lignocellulose material according to this invention.

According to this invention, wood or other lignocellulose material is chipped by known methods and subjected to short steaming at pressures between 1.5 and 20 atm. The steaming time, the temperature, and the pressure depend on the wood species. They are determined—and this is very important in this method—by the degree of lignocellulose material degradation, as found by analysis for the quantity of water soluble matter.

For the production of fibreboards of high dynamic strength similar to boards produced by the wet process, it is important to maintain the content of water soluble matter between 6 and 30%.

The steamed material is defibrated by conventional means such as disc defibrators, and according to requirements, it is then dried to a moisture content of 2–30%. The moisture content is controlled according to the kind of raw-material and the content of water soluble matter, and is therefore constantly checked. During the drying, which is carried out in an air stream, the coarse fibre fraction can be separated and reground in a special grinding mill, and the fibre particles can be classified according to their size. The heat accumulated in the material in the course of the process can be utilized for drying. The individual fibre fractions are conveyed by air streams to one or more volumetric feeders. The fibres are uniformly deposited on a moving belt in such a manner, that the fine fibre fractions form both surfaces and the coarser fractions an intermediate layer of the fibre mat so produced. The belt transports the fibre mat to a continuous drum press, where the fibre mat is compressed as is conventional. The precompression of the fibre mat is performed either at normal temperatures, or at temperatures above 100° C., whereby a better compression is obtained and the cushioning in the prepress is eliminated. Also, a better cohesion is obtained which allows the cutting of sharp edges and easier handling of the mats. The subsequent pressing time in a heated hydraulic press is also substantially reduced. Before the fiber mat enters the hydraulic press, it may be sprayed with water or with solutions of active substances which will protect the finished boards against fungi or insects, reduce their flammability, or increase their water resistance.

These agents may also be added during steaming or defibrating. The lignocellulose material is molded in a hermatically closed space, and the hermetic closure is preferably formed by the pressed fibre mat itself. The hermetic seal may be formed by an initially thicker layer of fibre on the edges of the fibre mat so that this layer forms a hermetic closure when compressed. A disadvantage of this method is the considerable less of material.

The chemical reaction which produces bonding substances in the sealed mold is held in a desired equilibrium by the selected content of water soluble matter and moisture in the defibrated material in a certain proportion dependent on the kind of lignocellulose material, and by the discharging of a steam-gas mixture which forms during the pressing. This steam-gas mixture is discharged either continuously or intermittently. The closure can be achieved by the fibre mat itself in the pressing caul shown in the accompanying drawing. One of the pressing cauls 1' is provided on its whole periphery with a continuous elevated frame 2 which is wedge-shaped. The fibres 3 are deposited in a layer of uniform thickness on the lower caul 1, which is not provided with the above mentioned frame 2, is covered with the caul 1'. The circumference of the frame 2 corresponds to the required shape of the molded board. The height of the frame 2 can be equal to the thickness of the board or higher, and in this case the opposite caul must be provided with a groove. The more strongly compressed material under the frame 2 at 4 forms a seal which prevents excessive escape of the steam-gas mixture.

The material compressed under the frame also, forms a parting line between the high-quality board and a weaker edge. The groove pressed by the frame 2 facilitates separation and trimming to size. The cauls of the invention produce pressings of required shape, high quality and with little waste. Providing pressing cauls with an elevated border or frame is not costly, and may be done on existing conventional cauls.

The excess steam-gas mixture is discharged either at one time, at intervals or gradually, but the equilibrium of the chemical reaction forming bonding substances is to be maintained. After 2 to 10 minutes' pressing time, depending on the thickness of the board, the hot board is withdrawn from the press. It does not require cooling under pressure. After pressing, the boards are edge-trimmed in the normal way, tempered or conditioned. The pressing conditions may vary according to the required quality of the board, the temperature varying between 180 and 260° C. and the pressures between 25 and 70 kg./cm.² By this manufacturing method, there are produced boards which are smooth on both sides, but the production of boards smooth only on one side is also possible.

As raw-material, almost all wood species may be used, soft wood as well as hard wood, and all other lignocellulose material. In this manufacturing process, the length of the elementary fibre is not the only factor determining quality of the product, but also the quantity and character of the active substances formed by the action of heat and moisture on the wood during steaming, defibrating, preheating and pressing.

We claim:

1. A process for the manufacture of fibreboards and other molded articles from fibrous lignocellulose material, comprising reducing said material to chips, subjecting the chips to the action of steam at a pressure ranging from 1.5 to 20 atm., until said chips contain an amount of water-soluble constituents ranging from 6 to 30%, reducing the steam-treated fibrous material to greater fineness, predrying the fine fibrous material to a moisture content of 2 to 30% while maintaining said amount of water-soluble constituents, forming said predried fine fibrous material into a mat while maintaining said moisture content and said amount of water-soluble constituents, subjecting said mat in a closed space to a consolidating pressure of 25 to 70 kilograms per sq. centimeter at a temperature between 180° and 260° C., whereby additional amounts of water-soluble constituents tend to form in said mat, and releasing steam from said space during the application of said consolidating pressure at a rate sufficient to maintain said amount of water-soluble constituents between 6 and 30 percent.

2. In the process according to claim 1, adding during said steam-treatment chemicals catalytically influencing said activation.

3. In the process according to claim 1, carrying out said predrying step by heat accumulated in said steam-treated fibrous material.

4. In the process according to claim 3, separating, prior to forming said mat, coarser fiber fractions from the predried fibrous material.

5. In the process according to claim 1, subjecting said mat, prior to subjecting same to said consolidating pressure, to a preliminary pressure at temperatures above 100° C.

6. In the process according to claim 1, said consolidating pressure being carried out with the aid of die plates, with one of said plates having edges and a fully closed peripheral elevation distanced from said edges, densifying the material of the mat being subjected to said consolidating pressure in the area of said elevation, and thus providing a closed space within which the consolidation pressing is carried out.

References Cited in the file of this patent

UNITED STATES PATENTS

| | | |
|---|---|---|
| 1,790,178 | Sutherland | Jan. 27, 1931 |
| 2,146,871 | Wiener | Feb. 14, 1939 |
| 2,317,394 | Mason | Apr. 27, 1943 |
| 2,454,532 | Walter | Nov. 23, 1948 |
| 2,583,994 | Briggs | Jan. 29, 1952 |
| 2,616,802 | Kehoe | Nov. 4, 1952 |
| 2,757,583 | Basler | Aug. 7, 1956 |
| 2,923,353 | Wells | Feb. 2, 1960 |
| 2,927,635 | Crane | Mar. 8, 1960 |
| 3,013,933 | Briggs | Dec. 19, 1961 |